US010628029B2

(12) United States Patent
Schillings et al.

(10) Patent No.: US 10,628,029 B2
(45) Date of Patent: *Apr. 21, 2020

(54) PREDICTING TOUCH INPUT

(71) Applicant: Facebook, Inc., Menlo Park, CA (US)

(72) Inventors: Benoit Schillings, Los Altos Hills, CA (US); Feng Qian, Santa Clara, CA (US); Jonathan Kaldor, San Mateo, CA (US); Gueorgui Djabarov, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/884,223

(22) Filed: Jan. 30, 2018

(65) Prior Publication Data

US 2018/0157410 A1      Jun. 7, 2018

Related U.S. Application Data

(63) Continuation of application No. 15/612,995, filed on Jun. 2, 2017, now Pat. No. 9,921,745, which is a continuation of application No. 13/749,543, filed on Jan. 24, 2013, now Pat. No. 9,703,473.

(51) Int. Cl.
*G06F 3/041* (2006.01)
*G06F 3/0488* (2013.01)

(52) U.S. Cl.
CPC ........ *G06F 3/04883* (2013.01); *G06F 3/0418* (2013.01)

(58) Field of Classification Search
None
See application file for complete search history.

(56) References Cited

U.S. PATENT DOCUMENTS

| | | | | |
|---|---|---|---|---|
| 8,436,827 B1* | 5/2013 | Zhai | ...................... | G06F 3/0416 |
| | | | | 178/18.01 |
| 8,487,896 B1* | 7/2013 | Brown | .................. | G06F 3/0418 |
| | | | | 345/173 |
| 2011/0310118 A1* | 12/2011 | Asmi | .................. | G06F 3/04883 |
| | | | | 345/619 |
| 2012/0068945 A1* | 3/2012 | Sugeda | ................ | G01C 21/367 |
| | | | | 345/173 |
| 2012/0300123 A1* | 11/2012 | Lares | .................... | G06F 3/0488 |
| | | | | 348/441 |

(Continued)

*Primary Examiner* — Kent W Chang
*Assistant Examiner* — Benjamin Morales
(74) *Attorney, Agent, or Firm* — Jordan IP Law, LLC

(57) ABSTRACT

Particular embodiments receive a plurality of touch events. Each touch event may be associated with at least one position on a touchscreen, and at least a portion of the plurality of touch events are substantially located along a line. Particular embodiments further determine that: (1) the touch events are approaching an edge of the touchscreen, and (2) one or more pressure measurements taken at one or more of the touch input events are less than a minimum pressure threshold. Based on the determinations, particular embodiments anticipate that the touch events will end before they reach the edge of the touchscreen, and based on the anticipating, particular embodiments terminate a series of extrapolated positions before the series of extrapolated positions reach the edge of the touchscreen.

21 Claims, 6 Drawing Sheets

(56) References Cited

U.S. PATENT DOCUMENTS

2013/0181908 A1* 7/2013 Santiago ............... G06F 3/0488
                                                      345/173
2014/0198052 A1* 7/2014 Tokutake ................ G06F 3/041
                                                      345/173

\* cited by examiner

PREDICTING TOUCH INPUT

PRIORITY

This application is a continuation under 35 U.S.C. § 120 of U.S. patent application Ser. No. 15/612,995 filed 2 Jun. 2017, which is a continuation of U.S. patent application Ser. No. 13/749,543 issued as U.S. Pat. No. 9,703,473, filed 24 Jan. 2013.

TECHNICAL FIELD

This disclosure generally relates to processing touch input and display output.

BACKGROUND

The vertical refresh rate of a display screen controls how often the display on the screen is refreshed, and it is measured in the number of times per second that the graphics hardware re-draws the display output (e.g., 60 Hz, 72 Hz, 100 Hz, 120 Hz). Vsync (vertical synchronization) eliminates page tearing artifacts by enabling the graphics hardware to introduce delay in order to synchronize the timing of the display refresh (i.e., the vertical blanking interval) with the timing of completion of a frame buffer fill. In embodiments where the display screen is a touchscreen, the timing of this display refresh may not be synchronized with the rate at which touch input is detected. This lack of synchronization may introduce a jerkiness particularly noticeable in applications where users expect to immediate real-time visual feedback based on user input. For example, if the user uses their fingertip to draw a line on a touchscreen, the rate at which the line appears on the screen may appear to occasionally accelerate or decelerate. In addition, the "leading edge" of the line as it is displayed may appear to lag behind the location of the user's fingertip.

SUMMARY OF PARTICULAR EMBODIMENTS

Particular embodiments provide smoothing of display of touch input events to provide a more realistic user experience. Some embodiments may correlate touch input events with the display refresh rate and extrapolate display output based on position and/or time information associated with the touch input events. Such extrapolated display output may be calculated for each display refresh event. Some embodiments may also analyze touch input events to predict touch input events and provide extrapolated display output based on position and/or time information associated with the next display refresh event.

DESCRIPTION OF EXAMPLE EMBODIMENTS

The vertical refresh rate of a display screen controls how often the display on the screen is refreshed, and it is measured in the number of times per second that the graphics hardware re-draws the display output (e.g., 60 Hz, 72 Hz, 100 Hz, 120 Hz). Vsync (vertical synchronization) eliminates page tearing artifacts by enabling the graphics hardware to introduce delay in order to synchronize the timing of the display refresh (i.e., the vertical blanking interval) with the timing of completion of a frame buffer fill. In embodiments where the display screen is a touchscreen, the timing of this display refresh may not be synchronized with the rate at which touch input is detected. This lack of synchronization may introduce a jerkiness particularly noticeable in applications where users expect to immediate real-time visual feedback based on user input. For example, if the user uses their fingertip to draw a line on a touchscreen, the rate at which the line appears on the screen may appear to occasionally accelerate or decelerate. In addition, the "leading edge" of the line as it is displayed may appear to lag behind the location of the user's fingertip.

Particular embodiments process touch input events and display output to provide a smoother viewing experience for a user using a touchscreen. In particular cases, the refresh rate of the touchscreen may not be synchronized with the rate at which touch input is detected. This lack of synchronization may introduce a jerkiness that is particularly noticeable in applications where users expect immediate real-time visual feedback based on user input. For example, if the user uses their fingertip to draw a line on a touchscreen, the rate at which the line appears on the screen may appear to occasionally accelerate or decelerate. Particular embodiments may correlate touch input events to the display refresh rate to determine extrapolated positions for the display output in accordance with the display refresh rate in order to smooth the appearance of display output and reduce jitter. Touch input events may comprise position data and time information.

In addition, the display output at each vsync event may experience latency due to different factors. For example, each frame buffer fill may not include touch input events received while the frame is being drawn. This means that when the user uses their fingertip to draw a line on a touchscreen, the rate at which the line appears on the screen appears to lag behind where the user's fingertip is currently located. Particular embodiments may analyze touch input events to generate a prediction of display output at the next vsync event using extrapolated display output in order to "draw closer to the fingertip."

Figure 1B:
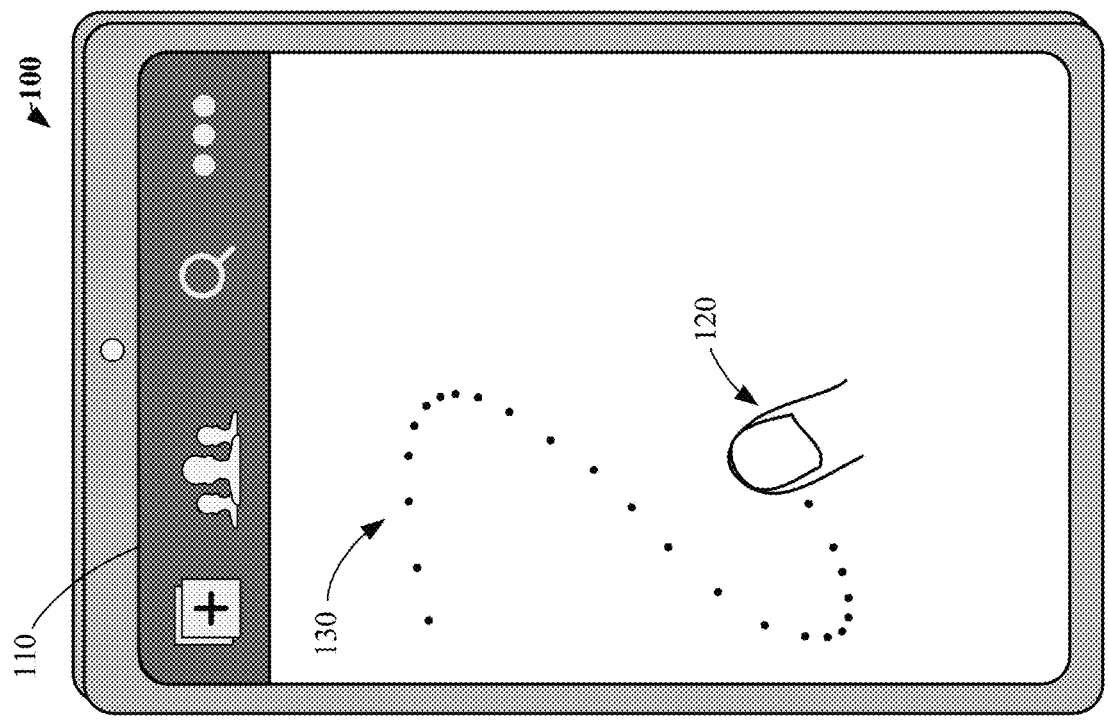
FIGS. 1A-B are wireframes illustrating an example of providing touch input.
Figure 1A:
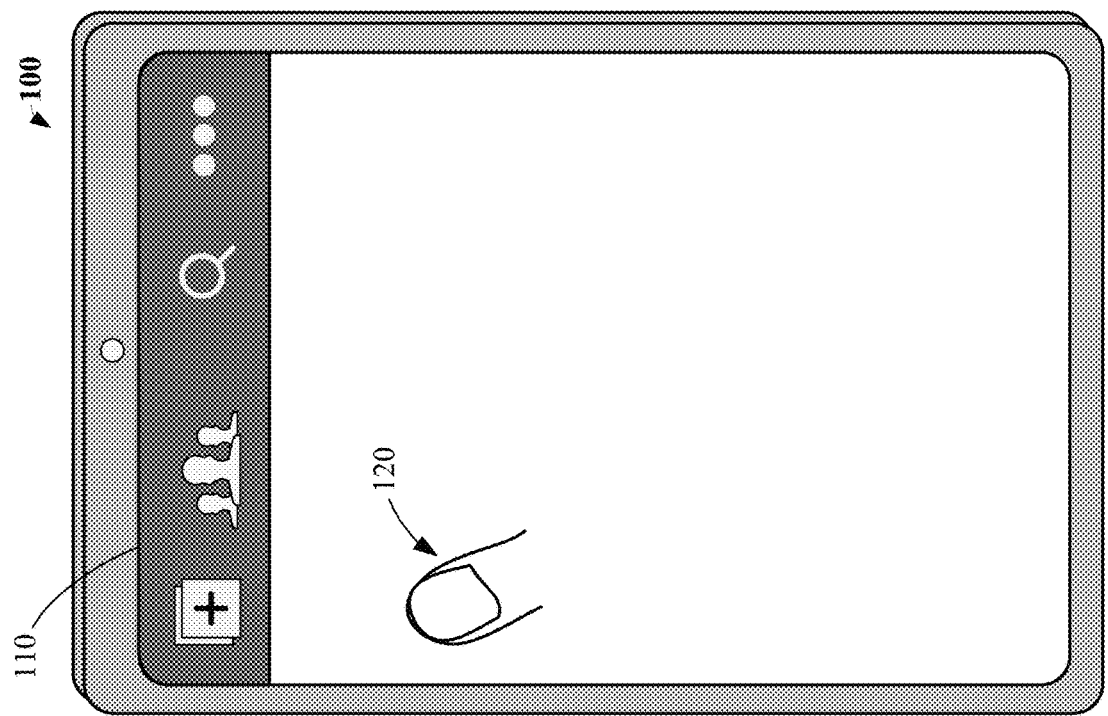

FIGS. 1A-B are wireframes illustrating an example of providing touch input. Computing device 100 includes a touchscreen 110, which may comprise any conventional touchscreen technology (e.g., capacitive, resistive, active touchscreen). Touchscreen 110 may display output based on a particular refresh rate, e.g., wherein vsync occurs at a rate of 60 Hz Touchscreen 110 may also sense and register touch input periodically, e.g., wherein the touch input is polled at a rate of 85 Hz. The user's finger 120 performs a swiping touch gesture represented by touch input events 130. Each touch input event 130 may comprise coordinates of a position of the touch input event with respect to touchscreen 110 as well as a time of the touch input event. In some embodiments, a touch input event 130 may also comprise other information captured at the time of the touch input event 130, e.g., physical pressure applied by the user's finger. As can be noted in FIG. 1B, when the user's finger changes direction as it goes around a curve, the user's finger slows down, then speeds up, resulting in a higher density of touch input events 130 in those areas where the finger is moving more slowly.

Figure 2A:
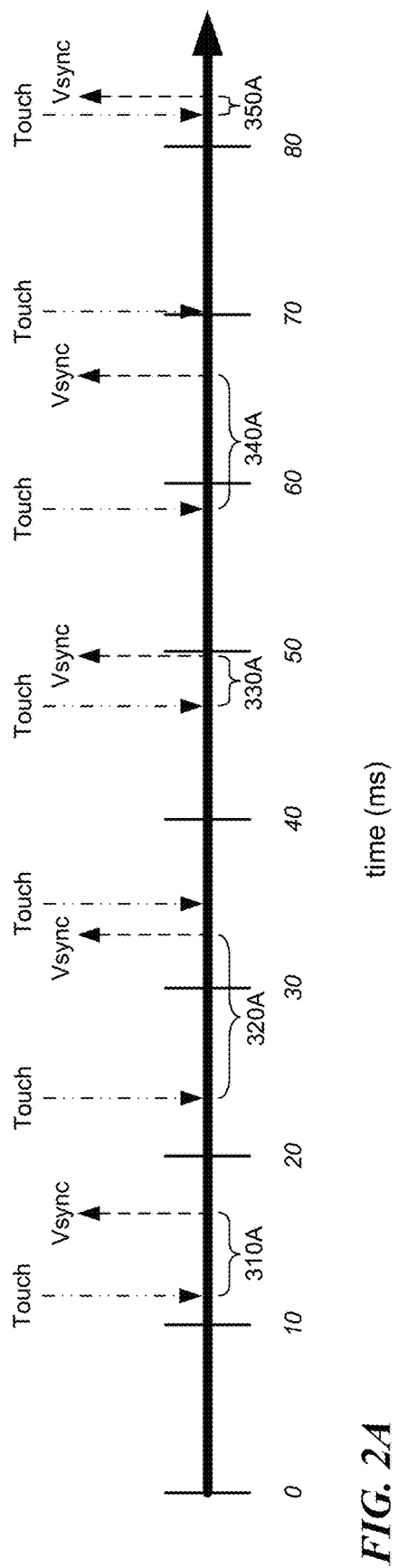
FIGS. 2A-B are graphs showing jerkiness due to a lack of synchronization between the refresh rate of the touchscreen and the rate at which touch input is detected.
Figure 2B:
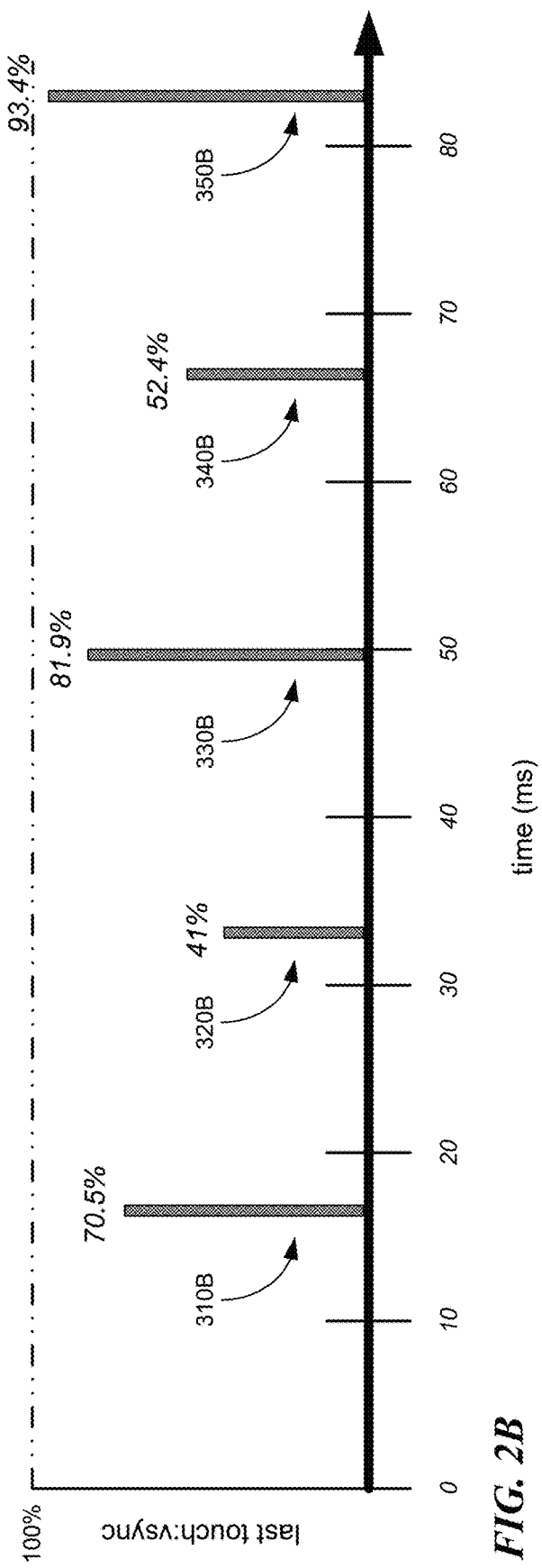

FIGS. 2A-B are graphs showing jerkiness due to a lack of synchronization between the refresh rate of the touchscreen and the rate at which touch input is detected. FIG. 2A is a graph plotting a series of example touch input events with a series of example vsync events. In this example, the frequency of the example touchscreen's response rate is 85 Hz, while the refresh (vsync) rate is 60 Hz—as a result, the touch input events occur more often than the vsync events (16.67 touch input events every 100 ms vs. 11.75 vsync display output events every 100 ms). In order to correlate a display output event to a touch input event, we start at the time of the display output event, find the preceding touch input event closest in time to the display output event, and determine the latency between the time of the display output event and the time of that preceding touch input event. This latency may (and will likely) vary for each display output event, so the correlation may need to be determined anew for each display output event.

Table 1 below shows, for each touch input-vsync delay, (1) the time on the timeline at which the vsync event occurs, (2) the number of touch input events that have occurred prior to the vsync event, (3) the delay from the most recent touch input event to the vsync event, and, (4) with respect to the duration of a display refresh cycle (vsync rate), the synchronization ratio, which indicates, over each vsync cycle how closely synchronized the last received touch input event is with the vsync event. The example values shown in Table 1 are based upon the specifications of the example touchscreen described above. As one of skill in the art would be aware, these values will vary based at least upon the specifications of the touchscreen used in any particular embodiment.

TABLE 1

Touch input/vsync correlation

| | Vsync | # Touch Inputs | Latency (ms) | Sync Ratio |
|---|---|---|---|---|
| 310A | 1 | 1 | 11.75 | 70.5% |
| 320A | 2 | 2 | 6.83 | 41.0% |
| 330A | 3 | 4 | 13.66 | 81.9% |
| 340A | 4 | 5 | 8.74 | 52.4% |
| 350A | 5 | 7 | 15.57 | 93.4% |

FIG. 2B is a graph plotting the synchronization ratios listed in Table 1 as they occur along the timeline. As can be seen from FIG. 2B, the refresh rate of touchscreen 110 is not synchronized with the touch input response rate of touchscreen 110, resulting in a noticeable delay between the last received touch input event and the vsync event. Worse yet, the delay continually varies, resulting in a jerky visual effect of repeated micro-accelerations and micro-decelerations as the display output is rendered, rather than a display output that smoothly tracks the motion of the user's finger. For example, the synchronization ratio 310B of 70.5% drops to 41% (320B), then comes closer to synchronization at 81.9% (330B), drops again to 52.4% (340B), and then comes closer again at 93.4% (350B). This jerkiness can be smoothed out by analyzing the touch input events, correlating the touch input events to the display refresh rate, and then extrapolating display output in accordance with the display refresh rate to synchronize the display output to the user's input.

Figure 2C:
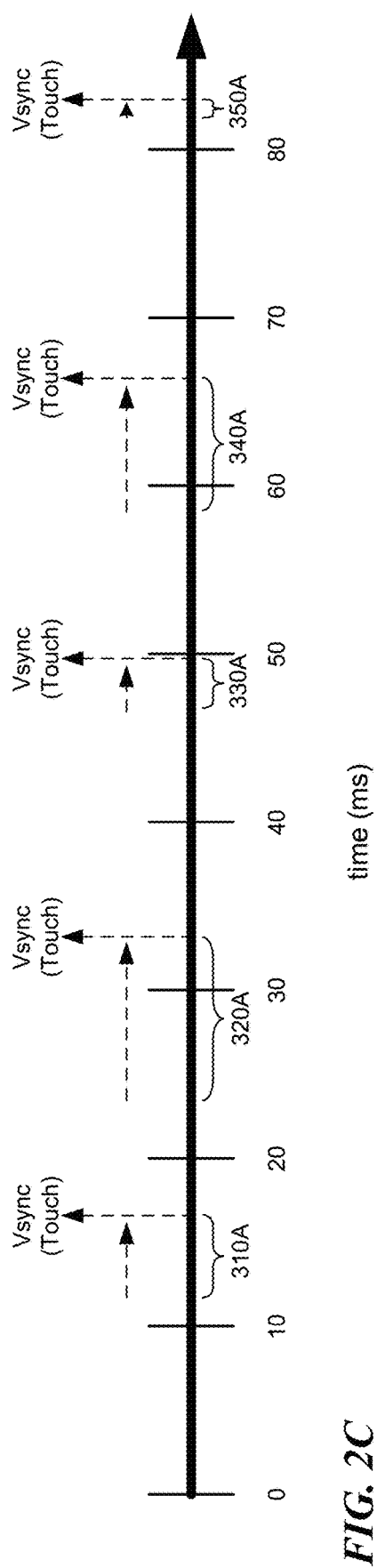
FIGS. 2C-D are graphs illustrating an example of smoothing display of the touch input events illustrated in FIGS. 1A-B by extrapolation.
Figure 2D:
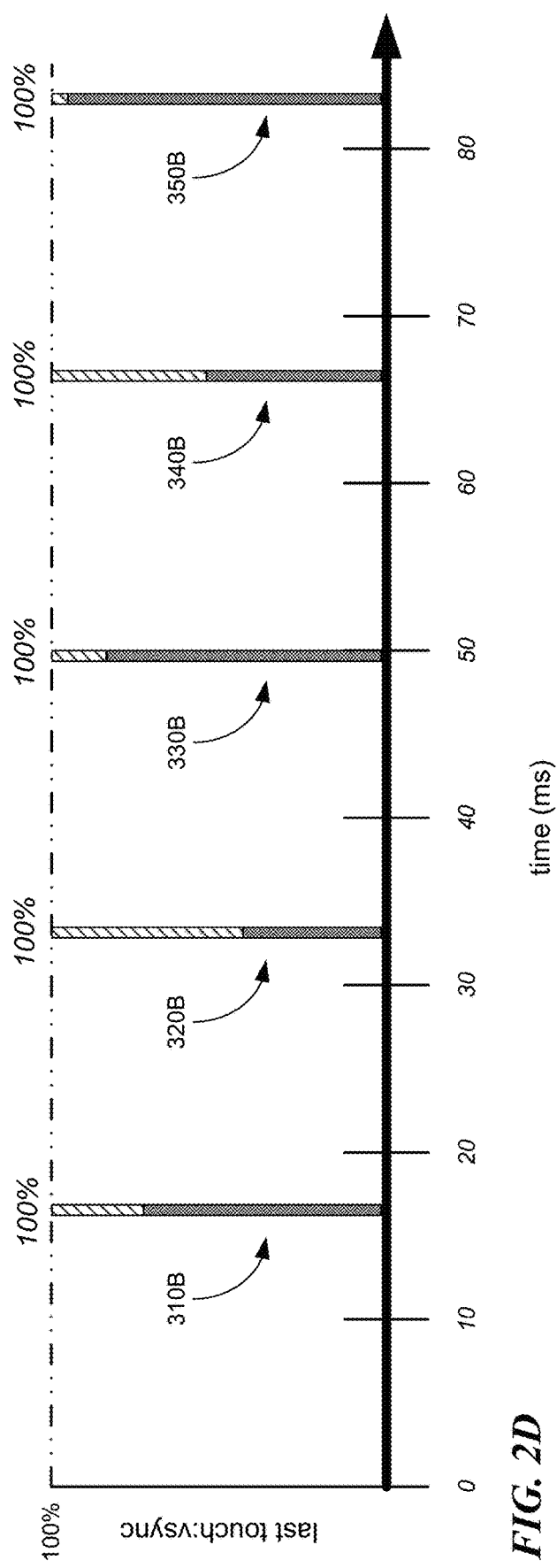

FIGS. 2C-D are graphs illustrating an example of smoothing a display of the touch input events illustrated in FIGS. 1A-B and FIGS. 2A-B by extrapolation. FIG. 2C illustrates one example of applying this technique: for each vsync event, the vsync event is compared to the most recent preceding touch input event. Extrapolation of display output at particular positions may be based on a sample set of touch input events, which may include (1) the last N touch input events 130 (e.g., the last eight touch input events), or (2) all touch input events received in the last T seconds (e.g., all touch input events in the last 100 ms), or (3) some combination thereof (e.g., up to eight of the most recent touch input events of those received in the last 100 ms). In some embodiments, only one position need be extrapolated per vsync event for the purpose of smoothing the display.

Extrapolation may be determined by using a data-fitting algorithm, such as a linear-fit algorithm, a curve-fitting algorithm, or a pattern-matching algorithm. In particular embodiments, touch input events may also be extrapolated using a pattern-matching engine that analyzes a log of position data related to touch input events 130. For example, the pattern-matching engine may determine that, over a pre-determined time period, the user's finger changed direction multiple times in a zigzag pattern and extrapolate touch input events accordingly.

In particular embodiments, the positions of touch input events 130 may also be analyzed with respect to the dimensions of touchscreen 110. For example, if the position information associated with the touch input events and the dimensions of the touchscreen indicate that the user's finger was rapidly approaching the edge of the touchscreen, positions may be extrapolated in anticipation that the user's fingertip will turn before it hits the edge of the screen. In particular embodiments, the positions of touch input events 130 may also be analyzed with respect to physical pressure measurements taken at each touch input event. For example, if the physical pressure measurements taken at each touch input event indicate that the user's finger was lifting as it moved, positions may not be extrapolated once the physical pressure measurements indicate that the user's finger was not applying a minimum threshold of pressure.

In particular embodiments, touch input events may also be extrapolated based on a machine-learning algorithm, so that, as the user makes certain types of complex pattern gestures repeatedly (e.g., handwriting cursive letters in English, or drawing Chinese characters), a pattern-matching engine may learn from the user's input, detect known patterns, and extrapolate accordingly.

FIG. 2D is a graph plotting the synchronization ratios for the extrapolated display output positions relative to the display output events as they occur along the timeline. As can be seen from FIG. 2D, each extrapolated position has been determined in accordance with the correlation that was calculated between the corresponding closest preceding touch input event and the display output event. Providing these extrapolated positions for display output thereby eliminates the variable delay and smoothes out the visual jerkiness.

Figure 3B:
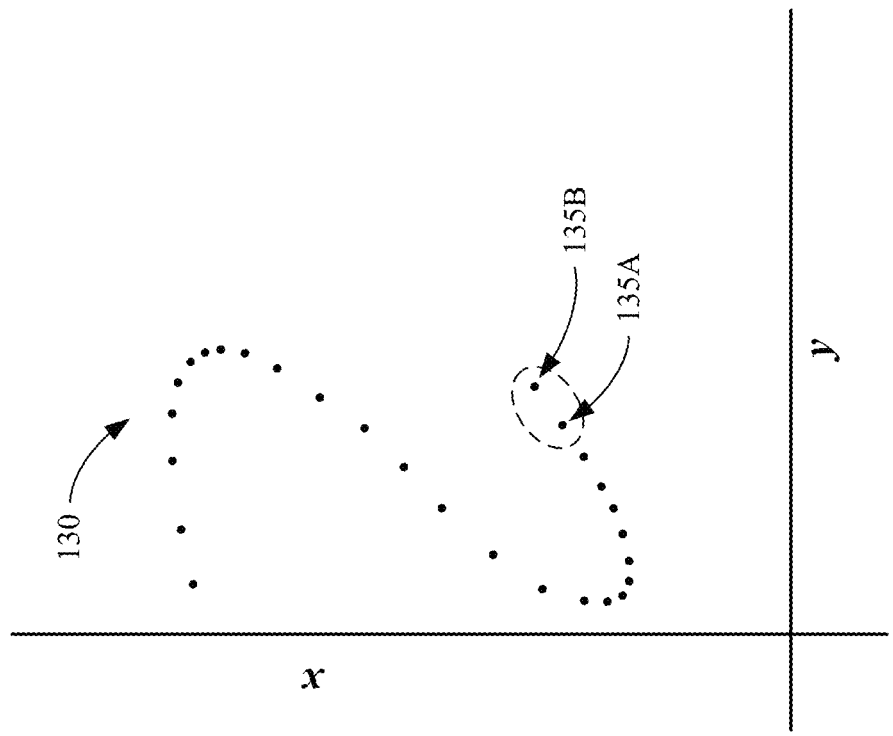
FIGS. 3A-B are graphs illustrating an example of predicting touch input events by extrapolation.
Figure 3A:
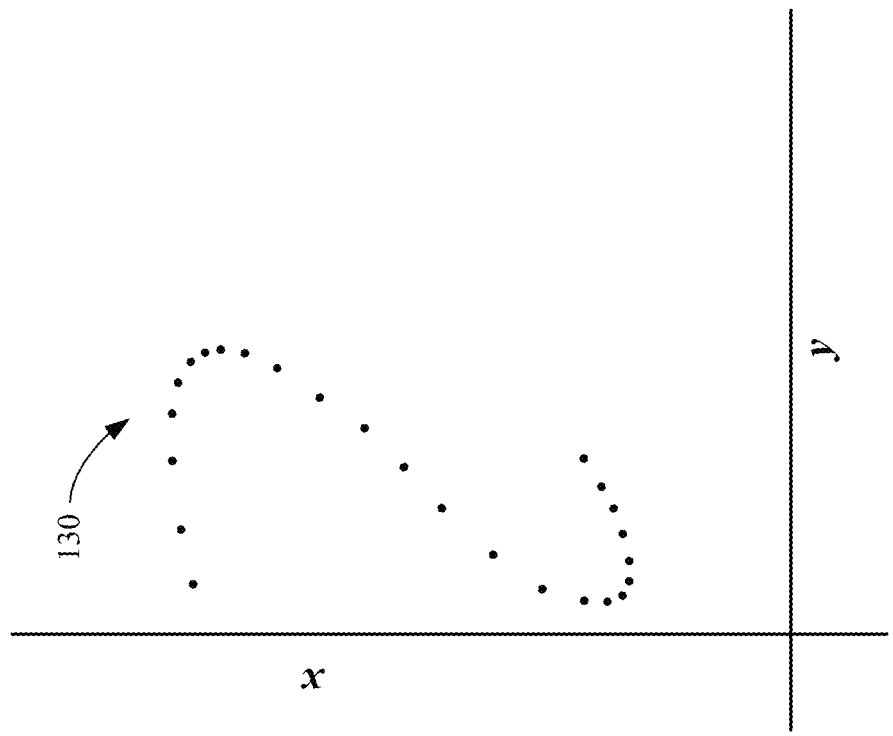

FIGS. 3A-B are graphs illustrating an example of predicting touch input events illustrated in FIGS. 1A-B by extrapolation. Typically, users using a touchscreen to enter touch input have a disjointed experience due to latency between the time of the last touch input event and the time of the last display refresh event, which causes a visual rolling gap between the location of the user's finger as it moves over the touchscreen and the leading edge of the display output. This latency may be on the order of 100 ms, whereas providing a realistic experience requires a reduction of that latency to a delay on the order of 1 ms, which closes the visual rolling gap and provides the user with the impression that they are indeed "drawing" the display output using their fingertip. One technique for reducing this latency comprises extrapolating one or more positions for display in order to close the gap.

FIG. 3A is a graph plotting the positions of touch input events 130 with respect to the plane of touchscreen 110. FIG. 3B is a graph plotting extrapolated positions 135. In particular embodiments, touch input events 135 are predicted based on extrapolation of the positions associated with touch input events 130.

In particular embodiments, touch input events 130 may also be analyzed based on a calculated velocity of the user's finger at the time of each vsync event, including any acceleration of the user's finger. For example, if the user's finger is moving at a constant velocity over the sample set of touch events, then the extrapolated display output may be estimated at the same velocity. In another example, if the user's finger is accelerating over the sample set of touch events, then the extrapolated positions may be estimated based on the acceleration. In particular embodiments, a total number of the estimated one or more positions may be inversely proportional to the velocity. In particular embodiments, only a limited number of extrapolated positions are estimated, so as to avoid providing display output that appears to "jump ahead" of the user's finger.

In some embodiments, each predicted touch input event 135 may be calculated based on touch input events 130 as well as any predicted predecessor touch input events 135. For example, in FIG. 3B, predicted touch input event 135A may be calculated based on the prior eight touch input events 130, and predicted touch input event 135B may be calculated based on predicted touch input event 135A and the seven touch input events 130 that precede predicted touch input event 135A. In other embodiments, all predicted touch input events 135 may be calculated based on the data-fitting algorithm.

Figure 4:
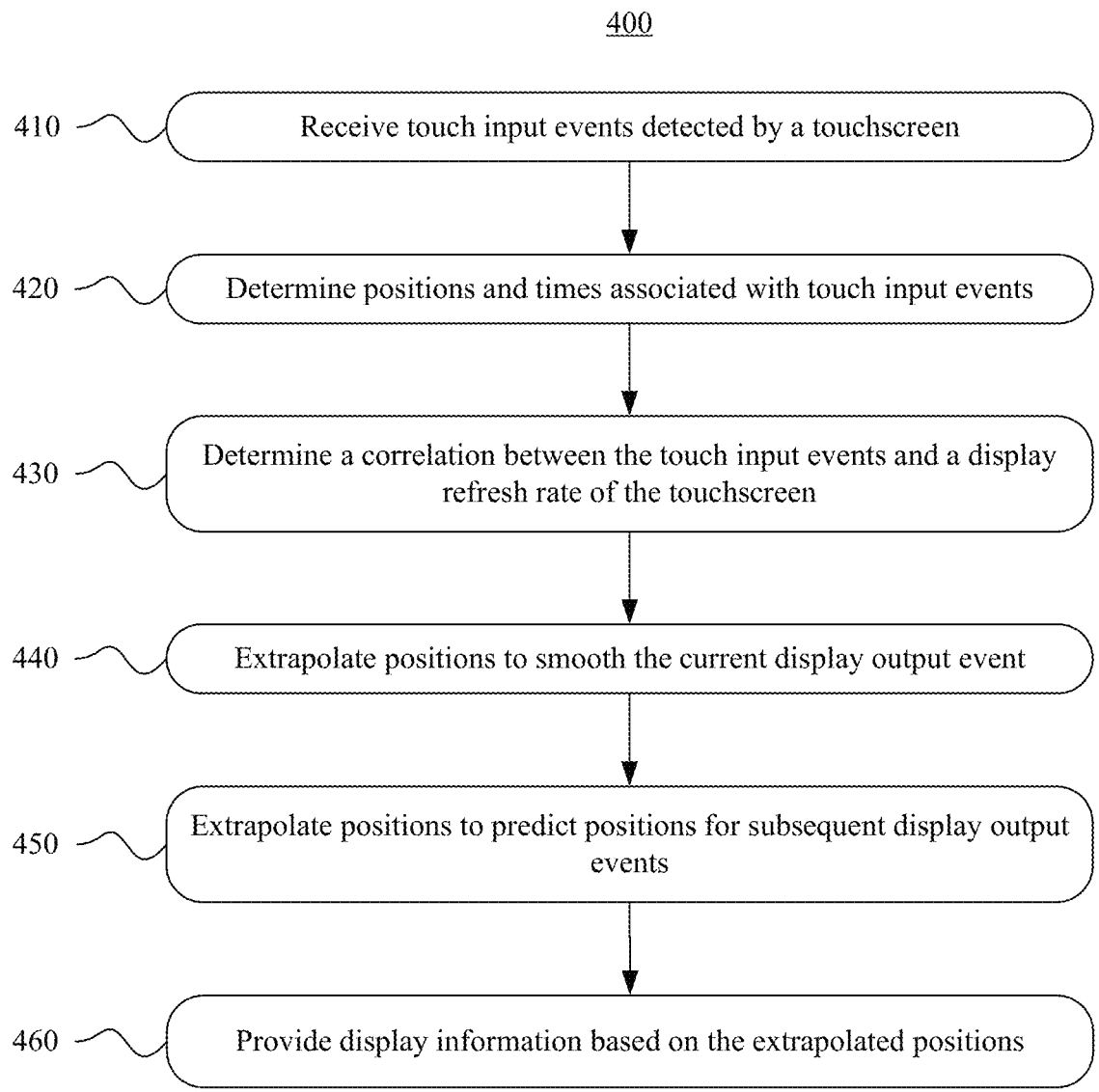
FIG. 4 is a flowchart illustrating an example method for processing touch input events and display output.

FIG. 4 is a flowchart illustrating an example method for processing touch input events and display output. In step 410, particular embodiments may receive touch input events detected by a touchscreen. In step 420, particular embodiments may determine positions and times associated with touch input events. Additional information associated with each touch input event may also be determined, such as a pressure value.

In step 430, particular embodiments may determine a correlation between the touch input events and a display refresh rate of the touchscreen, as described with respect to FIGS. 2A-D.

In step 440, particular embodiments may extrapolate a position for the current display output event to smooth the display output, as described with respect to FIGS. 2A-D. This position may be extrapolated based on touch events of the plurality of touch events that occurred prior to initiation of a frame buffer fill associated with the current display refresh event.

In step 450, particular embodiments may extrapolate additional positions to predict positions for subsequent display output events, as described with respect to FIGS. 3A-B. These additional positions may be extrapolated based on a timing of each of one or more display refresh events projected to occur subsequent to the current display refresh event. The total number of additional positions to be predicted may be determined based on an assessment of the visual rolling gap between the user's fingertip (the location of the most recently-received touch input event) and the leading edge of the display output as it is drawn (the location of the most recent display output).

In step 460, particular embodiments may provide display information based on the extrapolated positions.

Figure 5:
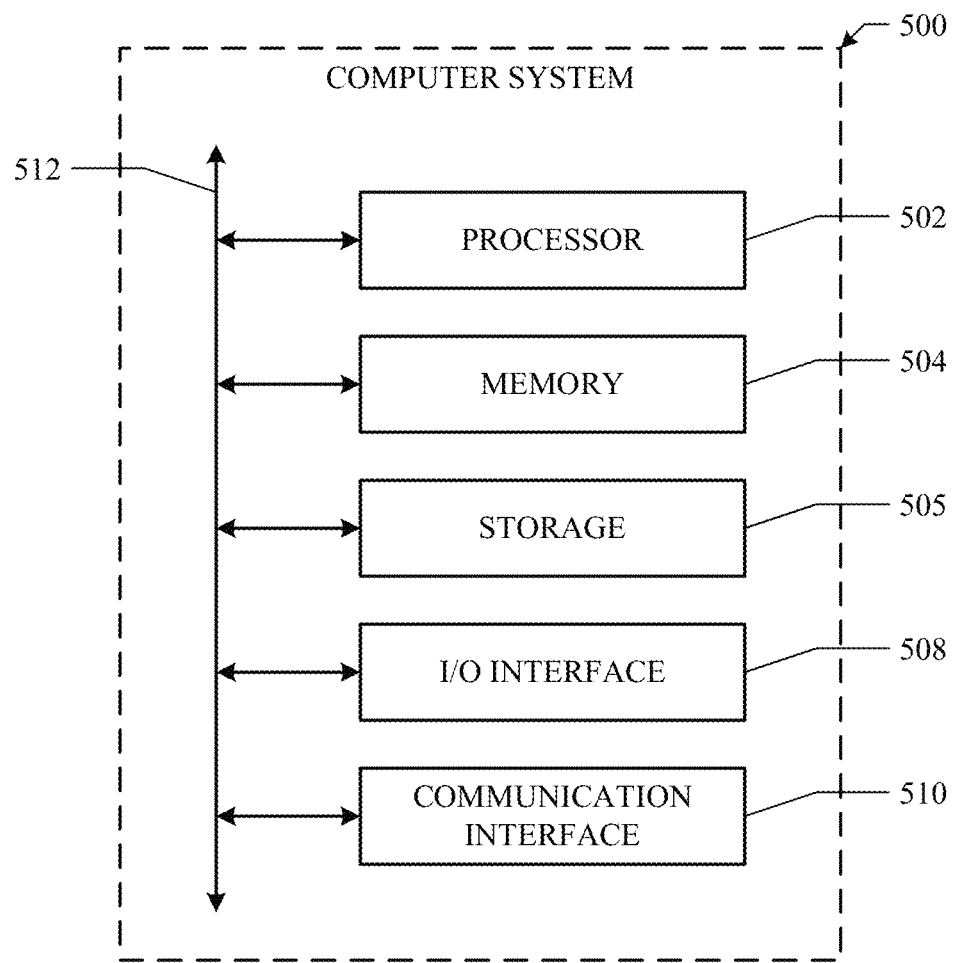
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a client device:
    receiving a plurality of touch input events, each touch input event being associated with at least one position on a touchscreen, wherein at least a terminal portion of the plurality of touch input events are substantially located along a line, and wherein one or more pressure measurements taken at one or more of the terminal portion of the plurality of touch input events are less than a minimum pressure threshold;
    determining that the terminal portion of the plurality of touch input events are approaching an edge of the touchscreen;
    determining, based on the one or more pressure measurements taken at one or more of the terminal portion of the plurality of touch input events being less than the minimum pressure threshold, that the user's finger is lifting off of the touchscreen; and
    in response to determining that the terminal portion of the plurality of touch input events are approaching an edge of the touchscreen and in response to determining that the user's finger is lifting off of the touchscreen based on the one or more pressure measurements taken at one or more of the terminal portion of the plurality of touch input events being less than the minimum pressure threshold, terminating a series of extrapolated positions before the series of extrapolated positions reaches the edge of the touchscreen.

2. The method of claim 1, wherein a first extrapolated position in the series of extrapolated positions is determined based on:
    a timing of a current display refresh event; and
    one or more touch input events of the plurality of touch input events that occurred prior to initiation of a frame buffer fill associated with the current display refresh event.

3. The method of claim 2, wherein one or more additional extrapolated positions in the series of extrapolated positions are determined based on a timing of each of one or more display refresh events projected to occur subsequent to the current display refresh event.

4. The method of claim 1, further comprising determining, for each touch input event, a time of the at least one position.

5. The method of claim 1, wherein a first extrapolated position of the series of extrapolated positions is determined based on a velocity calculated for each of the plurality of touch input events.

6. The method of claim 1, wherein a total number of extrapolated positions in the series of extrapolated positions is inversely proportional to an average velocity calculated over the plurality of touch input events.

7. The method of claim 1, wherein the series of extrapolated positions are determined based on an acceleration calculated over the plurality of touch input events.

8. The method of claim 1, wherein a first extrapolated position in the series of extrapolated positions is determined using a data-fitting algorithm, wherein the data-fitting algorithm is a linear-fit algorithm, a curve-fitting algorithm, or a pattern-matching algorithm.

9. The method of claim 1, wherein a location of a first extrapolated position in the series of extrapolated positions on the touchscreen is based on one or more dimensions of a contact surface of the touchscreen.

10. The method of claim 1, further comprising:
determining whether one or more future touch input events will turn before reaching the edge of the touchscreen;
wherein terminating the series of extrapolated positions is further based on the determining whether the one or more future touch input events will turn before reaching the edge of the touchscreen.

11. One or more computer-readable non-transitory storage media embodying software that is operable when executed to:
receive a plurality of touch input events, each touch input event being associated with at least one position on a touchscreen, wherein at least a terminal portion of the plurality of touch input events are substantially located along a line, and wherein one or more pressure measurements taken at one or more of the terminal portion of the plurality of touch input events are less than a minimum pressure threshold;
determine that the terminal portion of the plurality of touch input events are approaching an edge of the touchscreen;
determine, based on the one or more pressure measurements taken at one or more of the terminal portion of the plurality of touch input events being less than the minimum pressure threshold, that the user's finger is lifting off of the touchscreen; and
in response to determining that the terminal portion of the plurality of touch input events are approaching an edge of the touchscreen and in response to determining that the user's finger is lifting off of the touchscreen based on the one or more pressure measurements taken at one or more of the terminal portion of the plurality of touch input events being less than the minimum pressure threshold, terminate a series of extrapolated positions before the series of extrapolated positions reaches the edge of the touchscreen.

12. The media of claim 1, wherein a first extrapolated position in the series of extrapolated positions is determined based on:
a timing of a current display refresh event; and
one or more touch input events of the plurality of touch input events that occurred prior to initiation of a frame buffer fill associated with the current display refresh event.

13. The media of claim 12, wherein one or more additional extrapolated positions in the series of extrapolated positions are determined based on a timing of each of one or more display refresh events projected to occur subsequent to the current display refresh event.

14. The media of claim 11, wherein the software is further operable when executed to determine, for each touch input event, a time of the at least one position.

15. The media of claim 11, wherein a first extrapolated position of the series of extrapolated positions is determined based on a velocity calculated for each of the plurality of touch input events.

16. The media of claim 11, wherein a total number of extrapolated positions in the series of extrapolated positions is inversely proportional to an average velocity calculated over the plurality of touch input events.

17. The media of claim 11, wherein the series of extrapolated positions are determined based on an acceleration calculated over the plurality of touch input events.

18. The media of claim 11, wherein a first extrapolated position in the series of extrapolated positions is determined using a data-fitting algorithm, wherein the data-fitting algorithm is a linear-fit algorithm, a curve-fitting algorithm, or a pattern-matching algorithm.

19. A system comprising: one or more processors; and one or more computer-readable non-transitory storage media coupled to one or more of the processors and comprising instructions operable when executed by one or more of the processors to cause the system to:
receive a plurality of touch input events, each touch input event being associated with at least one position on a touchscreen, wherein at least a terminal portion of the plurality of touch input events are substantially located along a line, and wherein one or more pressure measurements taken at one or more of the terminal portion of the plurality of touch input events are less than a minimum pressure threshold;
determine that the terminal portion of the plurality of touch input events are approaching an edge of the touchscreen;
determine, based on the one or more pressure measurements taken at one or more of the terminal portion of the plurality of touch input events being less than the minimum pressure threshold, that the user's finger is lifting off of the touchscreen; and
in response to determining that the terminal portion of the plurality of touch input events are approaching an edge of the touchscreen and in response to determining that the user's finger is lifting off of the touchscreen based on the one or more pressure measurements taken at one or more of the terminal portion of the plurality of touch input events being less than the minimum pressure threshold, terminate a series of extrapolated positions before the series of extrapolated positions reaches the edge of the touchscreen.

20. The system of claim 19, wherein a first extrapolated position in the series of extrapolated positions is determined based on:
a timing of a current display refresh event; and
one or more touch input events of the plurality of touch input events that occurred prior to initiation of a frame buffer fill associated with the current display refresh event.

21. The system of claim 20, wherein one or more additional extrapolated positions in the series of extrapolated positions are determined based on a timing of each of one or more display refresh events projected to occur subsequent to the current display refresh event.

* * * * *